United States Patent
Mohammed et al.

(10) Patent No.: US 7,356,534 B2
(45) Date of Patent: Apr. 8, 2008

(54) PROVIDING NOTIFICATIONS FOR DOMAIN REGISTRATION CHANGES

(75) Inventors: Yunus Mohammed, Bellevue, WA (US); Michael A. Cohen, Seattle, WA (US); Joseph A. Kennebec, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 337 days.

(21) Appl. No.: 10/801,451

(22) Filed: Mar. 15, 2004

(65) Prior Publication Data

US 2005/0203875 A1 Sep. 15, 2005

(51) Int. Cl.
*G06F 17/30* (2006.01)
*G06F 7/00* (2006.01)
*G06F 15/173* (2006.01)

(52) U.S. Cl. .......................... 707/10; 709/223
(58) Field of Classification Search ................... 707/10; 709/223
See application file for complete search history.

(56) References Cited

U.S. PATENT DOCUMENTS

| | | | |
|---|---|---|---|
| 6,381,627 B1 | 4/2002 | Kwan et al. | |
| 6,411,966 B1 | 6/2002 | Kwan et al. | |
| 6,965,584 B2* | 11/2005 | Agrawal et al. | 370/331 |
| 7,076,541 B1* | 7/2006 | Burstein et al. | 709/223 |
| 2002/0010682 A1* | 1/2002 | Johnson | 705/59 |
| 2002/0016789 A1* | 2/2002 | Ong | 707/10 |
| 2004/0078487 A1* | 4/2004 | Cernohous et al. | 709/245 |
| 2004/0133664 A1* | 7/2004 | Colvig et al. | 709/221 |
| 2004/0172470 A1* | 9/2004 | Shiina | 709/224 |

OTHER PUBLICATIONS

Scott Suhy and Glenn Wood, "DNS and Microsoft Windows NT 4.0," Microsoft Corporation MSDN Library, 1996, available at <http://msdn.microsoft.com/library/default.asp?url=/library/en-us/dndns/html/dnsnt4.asp>, accessed on Mar. 14, 2004, 74 pages.
Marshall Brain, "How Domain Name Servers Work," How Stuff Works Website, available at <http://computer.howstuffworks.com/dns.htm/printable>, accessed on Mar. 14, 2004, 7 pages.
"Domain Name Registration: The Registrar System," available at <http://www.igoldrush.com/registrars.htm>, accessed on Mar. 14, 2004, 2 pages.

* cited by examiner

*Primary Examiner*—Kuen S. Lu
(74) *Attorney, Agent, or Firm*—Lee & Hayes, PLLC

(57) ABSTRACT

A strategy is described for alerting a user when an Internet domain becomes active. The strategy includes receiving a domain change request and logging this request in a domain table. The domain change request can instruct a registrar to create a new domain, or modify an existing domain (such as by transferring or re-delegating an existing domain). Monitoring logic is configured to use the domain table to perform periodic checks to determine whether the domain has become active. If the domain has become active, notification logic is configured to send a recipient a message which alerts the recipient to the activation of the Internet domain. The notification logic can send this message using electronic mail or some other communication mechanism.

24 Claims, 6 Drawing Sheets

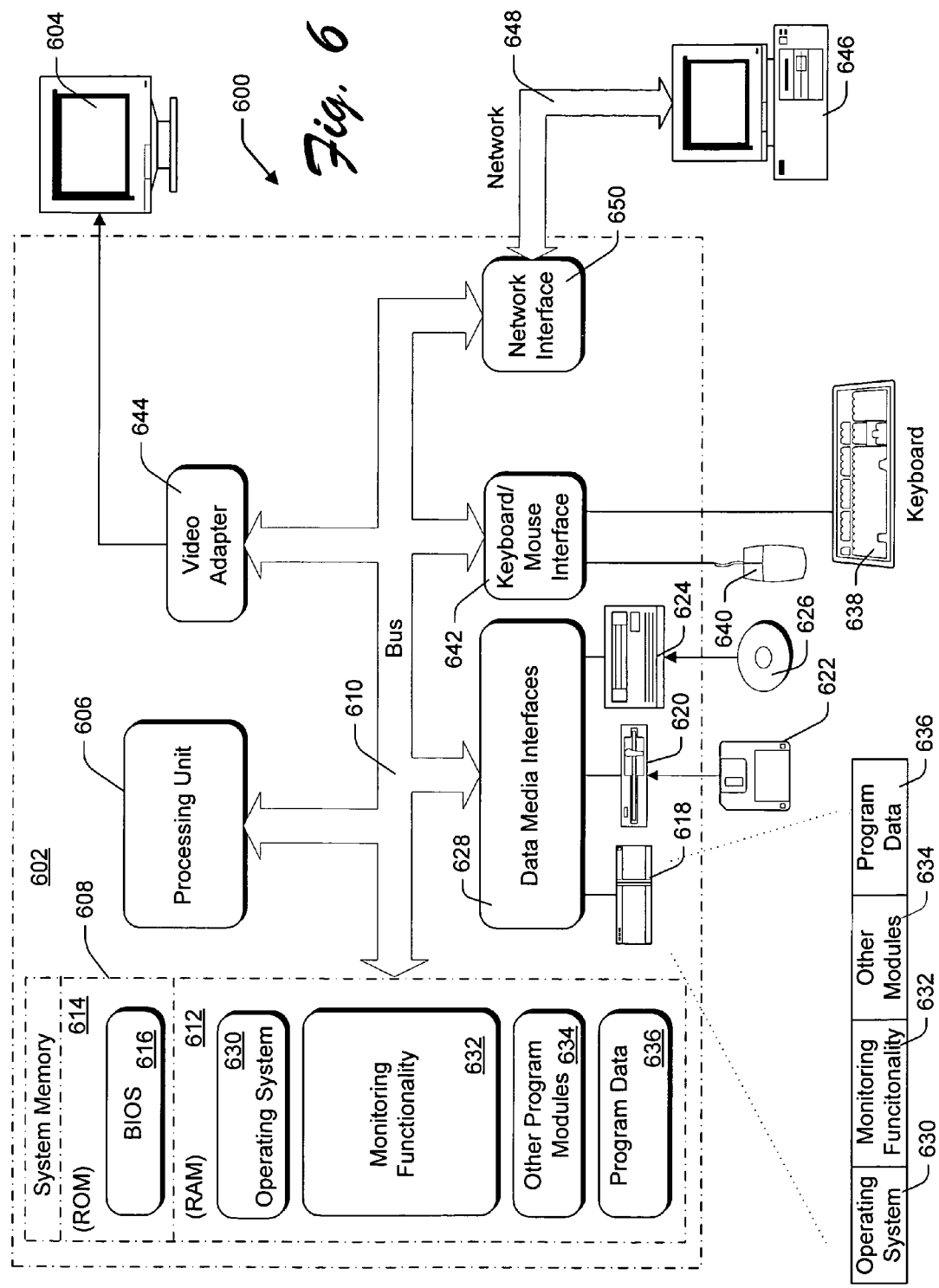

PROVIDING NOTIFICATIONS FOR DOMAIN REGISTRATION CHANGES

TECHNICAL FIELD

This subject matter relates to the processing of domain name changes in a network environment, and, in a more particular implementation, to the handling of domain name registration events in an Internet environment.

BACKGROUND

Resources are accessed over the Internet using a human readable domain name, such as AcmeXYZ.com, which identifies an Internet resource maintained by a hypothetical company, AcmeXYZ Corporation. To locate this resource, the Internet will convert the domain name AcmeXYZ.com into its Internet Protocol (IP) address. Internet protocol addresses refer to 32 bit numbers arranged into four octets, where each octet is separated by a period (e.g., xxx.xxx.xxx.xxx, where "xxx" refers to a number from 0 to 255, that is, 0 to $2^8$). Resources that are accessible over the Internet each have their own unique IP address.

FIG. 1 illustrates a domain name space 100 formed by all of the domains accessible through the Internet. As shown in FIG. 1, the domain name space forms an inverted tree structure including a plurality of nodes representative of respective domains. A top level node 102 pertains to a root of the domain name space 100. A plurality of second level nodes (e.g., 104-116) refer to so-called top level domains (TLD) allocated to different high level fields. For instance, node 104 pertains to a top level domain allocated to commercial organizations. Node 106 pertains to a top level domain allocated to educational organizations. Node 108 pertains to a top level domain allocated to U.S. governmental organizations (such as the U.S. State Department, etc.). Node 110 pertains to a top level domain allocated to international organizations (such as NATO, etc.). Node 112 pertains to a top level domain allocated to military operations. Node 114 refers to a top level domain allocated to networking organizations. Node 116 refers to a top level domain allocated to noncommercial organizations (such as the American Red Cross, etc.). These are merely a representative sampling of top level domains; there are currently over 100 such top level domains. For instance, top level domains have been allocated to each country, such as "uk" for the United Kingdom.

Each top level domain includes a plurality of sub-domains that fall under the general category established by the top level domain. For example, exemplary sub-domain 118 is shown in FIG. 1 for providing resources in connection with the hypothetical AcmeXYZ Corporation. This exemplary sub-domain 118 includes a series of nodes, including main level node 120 (associated with the domain name "AcmeXYZ.com") and a plurality of associated sub-nodes that depend from the main node 120. One of more or these sub-nodes can form a sub-domain, such as exemplary sub-domain 122 that identifies a sub-resource under the general category of AcmeXYZ.com. In this case, the sub-domain identifies the sub-resource of Shopping.AcmeXYZ.com, which might identify a hypothetical online shopping service maintained by AcmeXYZ.com.

In terms of physical infrastructure, the Internet can allocate different computing equipment to different nodes in the domain name space 100 for handling domain name resolution. Collectively, this equipment is referred to as the Domain Name System (DNS). Such equipment can include a variety of servers, databases, etc. The equipment can specifically include a plurality of domain name servers (referred to for brevity below as "name servers"). A name server performs the role of converting a human readable domain name into its assigned IP address. Each name server include a subset of the total universe of domain names and associated IP addresses. Accordingly, the entire collection of name servers employed in the Internet forms an immense distributed database. For instance, the hypothetical AcmeXYZ Corporation can allocate a plurality of name servers, including one name server allocated to serving the sub-domain 122. Each name server can store domain name information pertinent to its operation in a zone file database (not shown).

FIG. 2 illustrates one exemplary technique for resolving a domain name, that is, for converting a specified human readable domain name into a 32 bit IP address. In this technique, a client computer 202 accesses a local name server 204 in attempt to resolve the exemplary domain name "AcmeXYZ.com" associated with domain 118 (and node 120) of FIG. 1. For instance, the client computer 202 can be preconfigured to first look to an identified local name server 204 in attempting to resolve a domain name. The local name server 204 could be, for instance, implemented by an Internet Service Provider (ISP) associated with the client computer 202. If the local name server 204 stores the IP address of AcmeXYZ.com, then this name server 204 can immediately return the IP address to the client computer 202, whereupon the client computer 202 can directly access the resources associated with AcmeXYZ.com at that IP address. However, if this is not the case, the local name server 204 can iteratively contact a series of other name servers to resolve the domain name. In one technique, the local server 204 can contact a name server 206 associated with the root node 102 of FIG. 1. This name server 206 can identify a name server 208 associated with the top level domain assigned to commercial (.com) organizations, pertaining to top level node 104 of FIG. 1. The local name server 204 can then contact the name server 208 to resolve the address AcmeXYZ.com. If the IP address cannot be obtained from this name server 208, then the name server 208 can identify another name server 210 associated with the AcmeXYZ Corporation. The local name server 204 can then finally obtain the IP address from that name server 210 and forward it back to the client computer 202. FIG. 2 illustrates this exemplary series of transactions by numbers placed in parentheses, e.g., (1), (2), etc. To expedite operation, the name servers shown in FIG. 2 will typically cache domain names and associated IP addresses for a predetermined about of time, allowing those cached domain names to be resolved more quickly if there are subsequent requests from client computers regarding these domain names.

Well defined procedures exist for creating domain names and changing domain names. For instance, a user may desire to establish a new unique domain name associated with new resources that it seeks to make available over the Internet. Alternatively, a user may wish to transfer a preexisting domain from one entity to another entity (such as from one vendor to another vendor). As a result of this transfer, the domain name files need to be updated so that the domain name points to the name servers associated with the new vendor. Still alternatively, a user may wish to re-delegate the domain so that it is served by a different set of name servers than before, but otherwise the domain remains associated with the same entity (e.g., vendor).

Currently, the above-identified changes are performed by submitting instructions regarding these changes to a registrar, such as Network Solutions, Inc. A registrar is typically a company that has been empowered to make the changes specified by the user. These changes will ultimately be entered into a central database (referred to as the "WHOIS" database. The registrar also performs the task of propagating the new domain name information to any name servers that require this information, such as, in the case of the new domain name AcmeXYZ.com, the name servers associated with top level domain node 104 of FIG. 1. The domain only becomes active after all the necessary changes have been propagated through the network and the necessary zone file databases contain the required domain name information.

FIG. 3 shows a procedure 300 that describes the above-mentioned operations in greater detail. In step 302, the user registers a new domain with a registrar, or asks the registrar to update the name server (NS) information for a currently registered domain name. As mentioned, in the case of an update, the user may be interested in transferring a domain or re-delegating a domain. Typically, the registrar allows a user to make the changes referred to in step 302 via an online service, such as by filling out and submitting an electronic form which identifies the required domain name information. As reflected by the two topmost ovals shown in FIG. 3, prior to step 302, the user's domain does not exist (in the case where the user seeks to create a new domain), or the user's domain provides "old" domain name information (in the case where the user seeks to modify the existing, e.g., "old," domain name information). After step 302, the registrar now has instructions to create a new domain name or modify the existing domain name, but these changes are not yet "live" (e.g., active) in the domain name system (DNS).

In step 304, the registrar updates the registry (such as the "WHOIS" database) with domain settings (to reflect a new domain, a transferred domain, or a re-delegated domain). However, after this step, the new or updated domain is still not active.

In step 306, the registrar propagates the domain name changes to appropriate name servers throughout the network, such as the name servers associated with the top level domain pertaining to the domain name being created or changed. This change ultimately results in the loading of a zone file in one or more databases associated with one or more name servers. Finally, after step 306, the domain is considered active. This means that any user can type in the domain name corresponding to Acme.YYZ.com and the DNS will resolve this domain name to the correct IP address that has been stored in the appropriate name servers.

While the basic procedure 300 described in FIG. 3 is fairly uniform throughout the Internet, the time required to implement these operations is highly variable. For instance, a domain change that affects the .com top level domain may take a different amount of time than a domain change that affects the .org top level domain. This may reflect the fact that these different top level domains require the registrar to perform a different series of administrative operations in order to activate a new or updated domain. For instance, the processing time associated with different countries (e.g., ".fr" for France and ".uk" for the United Kingdom) may differ due to the different regulations imposed by these countries regarding the registration and modification of domain names. Moreover, even within the same top level domain, the time required to process domain name registration requests may vary depending on registrar workload and other factors. Generally, because of the myriad of factors involved, it is very difficult for a user to accurately predict when a domain will become active.

The user's inability to determine when a domain name will become active can lead to various negative consequences. For instance, in a competitive commercial environment, the user may wish to alert its customers as soon as possible when an Internet resource becomes available so that the customers can resume their business activities that rely on this resource. This cannot be performed without requiring the user to perform time-consuming investigation to determine when the domain has become active. This difficulty is compounded in those commercial environments that regularly add new domain names and modify existing domain names.

Accordingly, there is an exemplary need in the art for a more effective technique for determining when a domain has become active in a network environment, such as the Internet.

SUMMARY

According to one exemplary implementation, a method is described for notifying a user of the activation of a domain. The method includes: (a) receiving a domain change request from a requesting entity; (b) logging information obtained from the domain change request; (c) monitoring a change implementation entity to determine when a domain specified in the domain change request has become active; and (d) sending a notification to a recipient entity when the domain has been determined to become active.

By virtue of the monitoring and notification, a user that makes a domain change request can be timely apprised of when the domain identified in the request becomes active.

Additional exemplary implementations are described in the following.

BRIEF DESCRIPTION OF THE DRAWINGS

FIG. 6 shows an exemplary computer environment for implementing portions of the system shown in FIG. 4.

Figure 1:
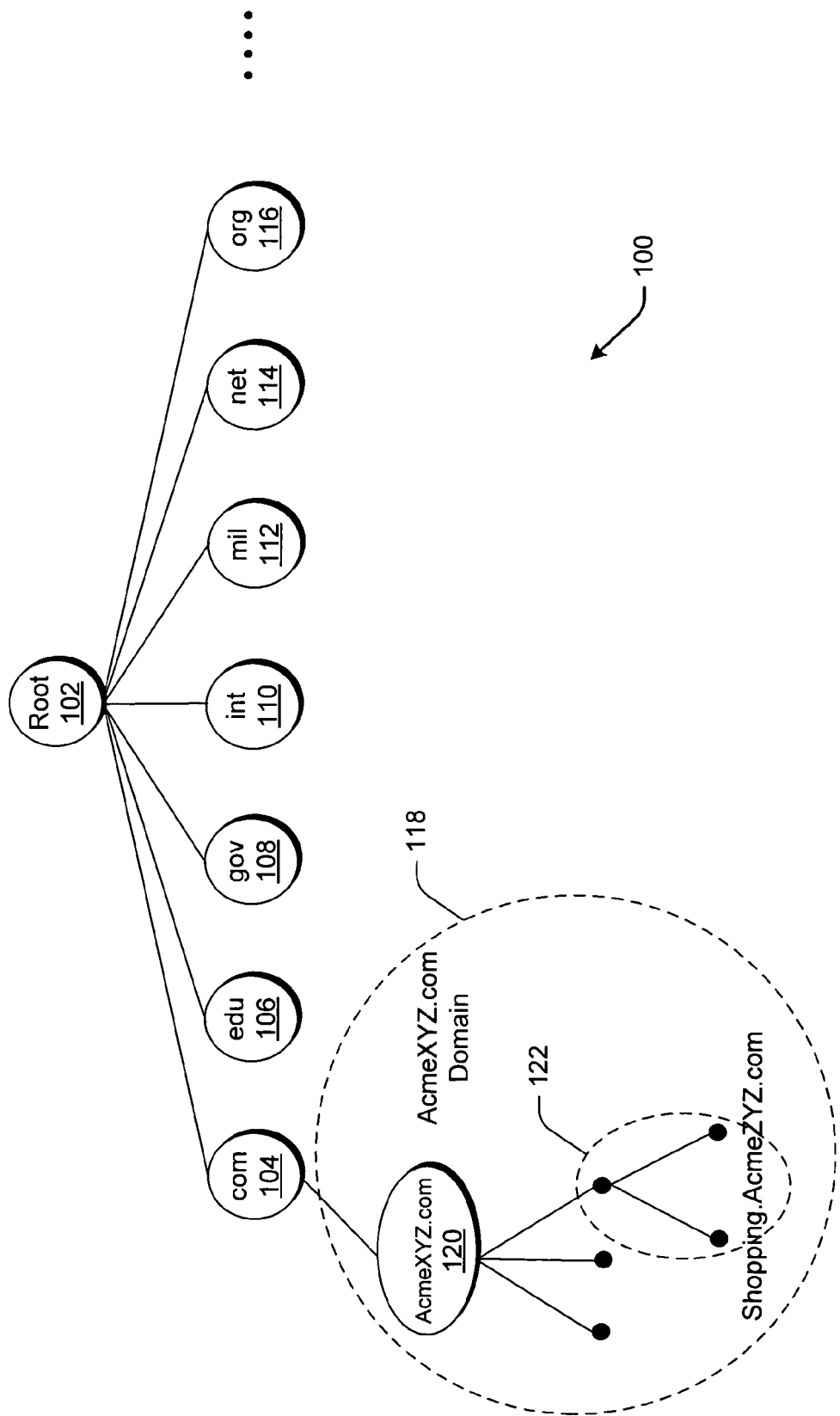
FIG. 1 shows a conventional domain name space for organizing Internet domain names.
Figure 2:
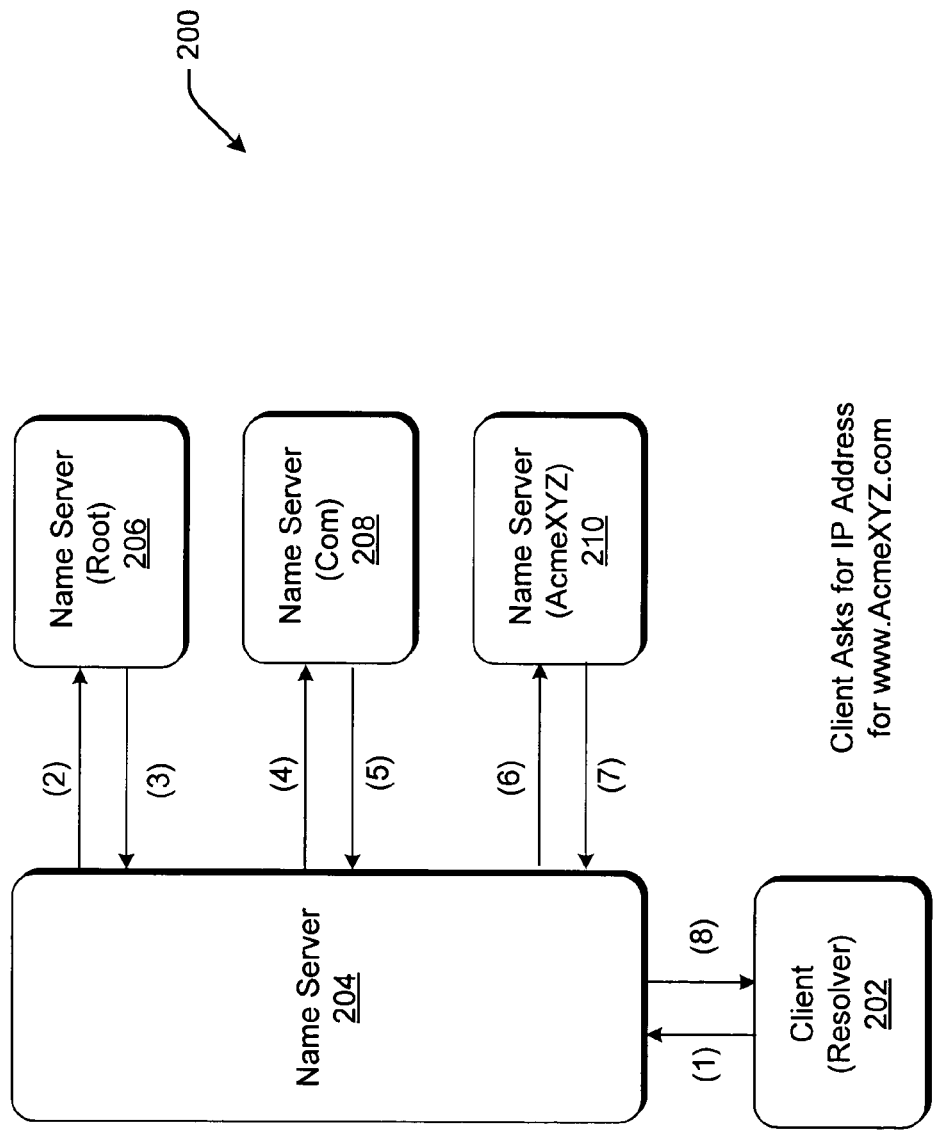
FIG. 2 shows an exemplary procedure for resolving a domain name using Internet domain name servers.
Figure 3:
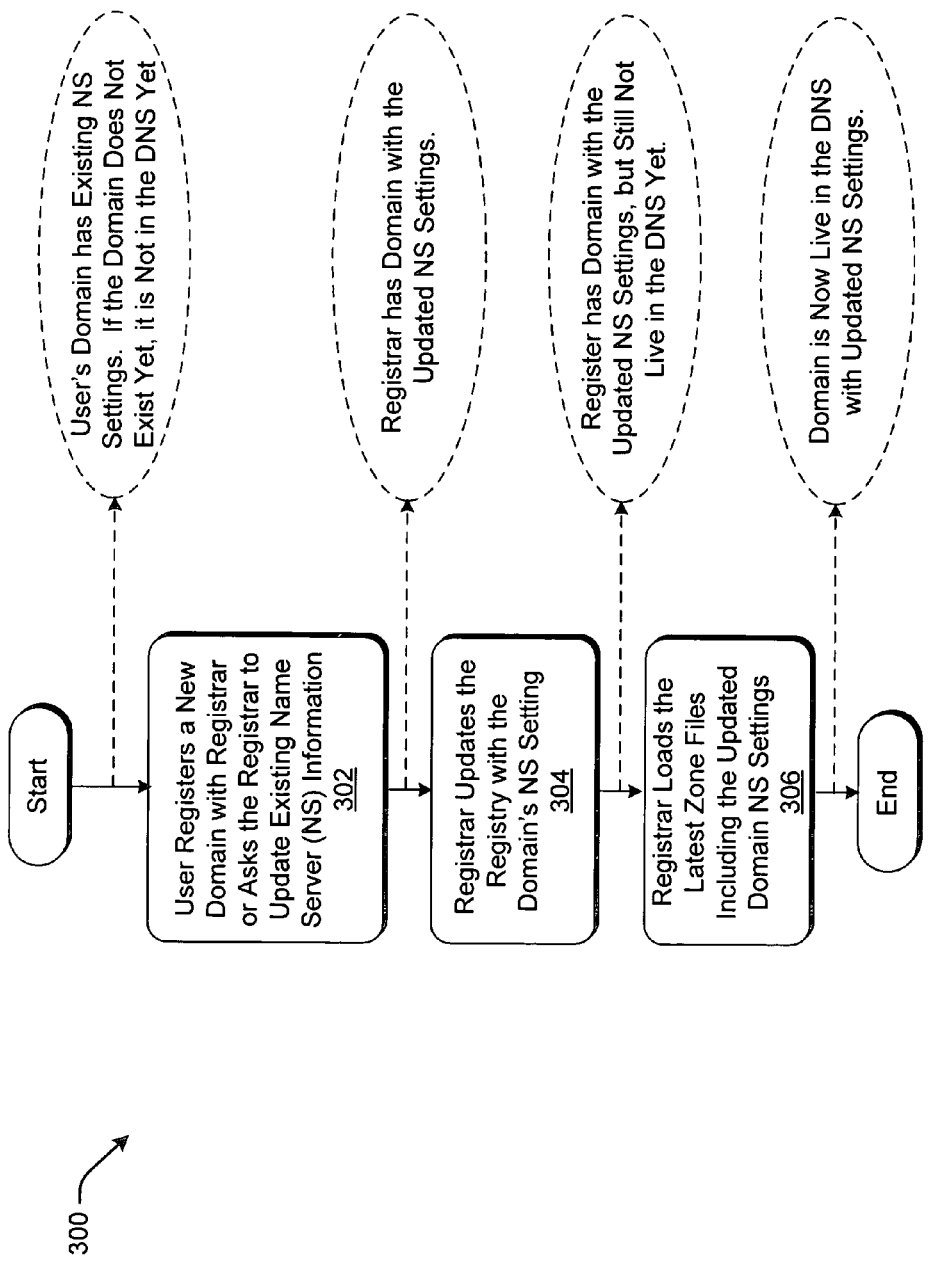
FIG. 3 shows an exemplary procedure for creating or changing a domain in the Internet.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The following description sets forth a strategy for notifying a user of a change in a domain in a network environment. That is, the strategy alerts the user when a domain becomes active.

Generally, any of the functions described herein can be implemented using software, firmware (e.g., fixed logic circuitry), manual processing, or a combination of these implementations. The term "logic" as used herein generally represents software, firmware, or a combination of software and firmware. In the case of a software implementation, the logic represents program code that performs specified tasks when executed on a processing device or devices (e.g., CPU or CPUs). The program code can be stored in one or more computer readable memory devices.

Further, a number of examples will be presented in this disclosure in the alternative (e.g., case A or case B). In addition, this disclosure encompasses those cases which combine alternatives in a single implementation (e.g., case A and case B), even though this disclosure may not expressly mention these conjunctive cases in every instance.

A. Overview of an Exemplary System for Processing Domain Changes

Figure 4:
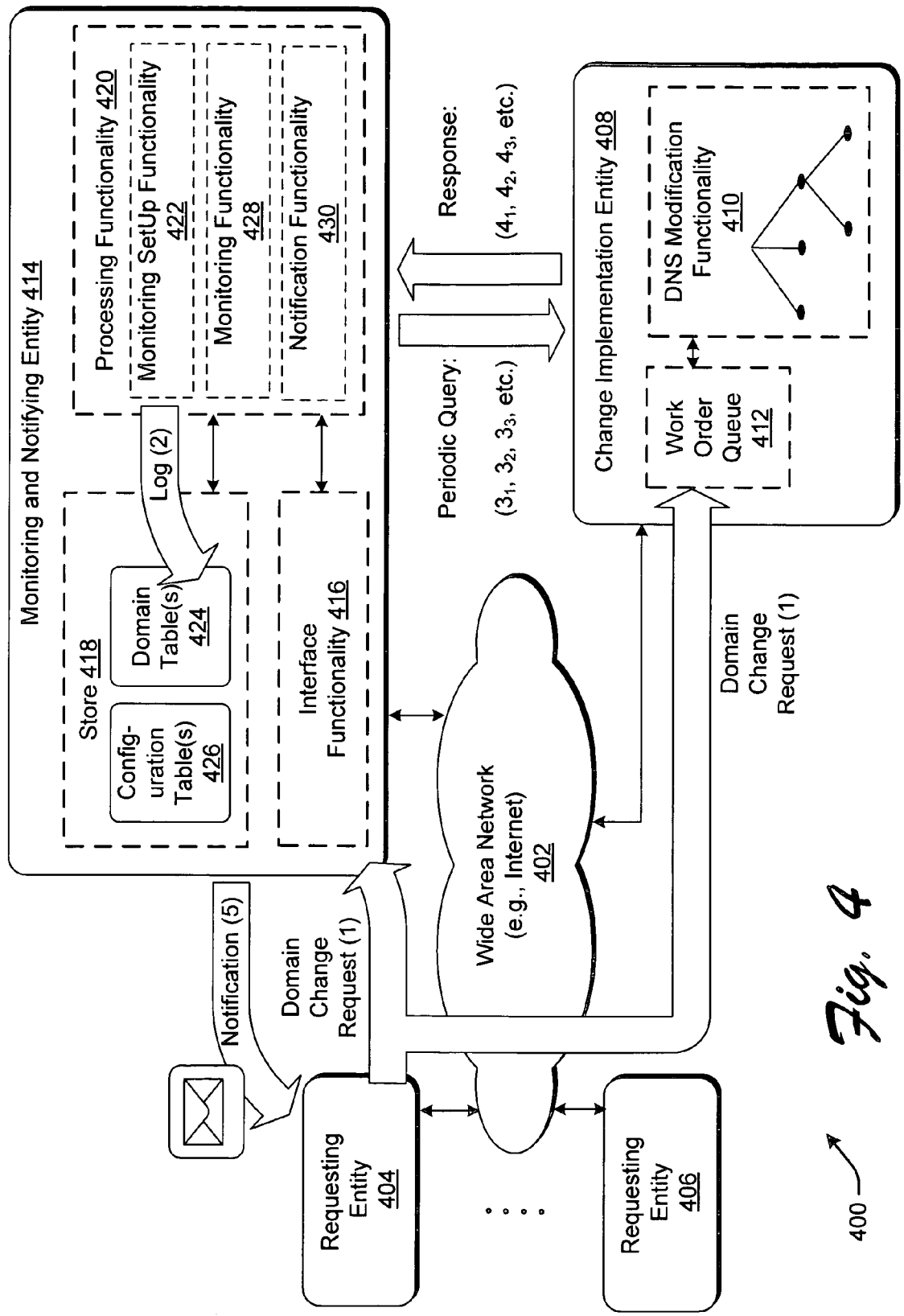
FIG. 4 shows an exemplary system for notifying a user of domain changes.

FIG. 4 describes an exemplary system 400 for notifying a user of the activation of a domain in response to a domain name request made by a user. The network environment featured in this description pertains to a wide area network WAN 402, such as the Internet. The Internet is a combination of networks and infrastructure for transferring information in packets using defined protocols, such as the Transmission Control Protocol (TCP) and the Internet Protocol (IP). However, the techniques described here can be implemented in any network environment, such as a local area network (LAN), an Intranet network, and so on. Although not shown, the implementing network can include any combination of servers, databases, routers, gateways, hardwired communication links, wireless communication links, and so on.

The WAN 402 permits one or more requesting entities, such as exemplary requesting entities 404 and 406, to make requests regarding domain name changes. In one case, a user may request the registrar to create a new domain name that did not exist before. In another case, the user may request the registrar to transfer a domain name from one entity to another, such as from one vendor to another. In another case, the user may request the registrar to change the name servers that are assigned to a domain (but otherwise not transfer the domain from one entity to another). In the following discussion, the general term "change request" can refer to any of the above registration scenarios (or other types of registration scenarios.) Whatever the case, FIG. 4 illustrates the request generated by an exemplary requesting entity 404 by the arrow labeled "Request (1)," where the parenthetical (1) indicates that this transaction is the first operation in a series of operations performed by the system 400. The system can transfer this request to the appropriate recipient(s) using the WAN 402 or using some other communication mechanism.

The user making the above-identified change request may correspond to a user who wishes to set up or change a domain for his or her personal use. Alternatively, the user may correspond to an individual employed by a company or other organization who is assigned the role of interacting with the registrar to make domain name changes on behalf of the company or organization. The user may alternatively correspond to some other individual serving in some other capacity. Still alternatively, the user can correspond to automated functionality that performs the role of submitting domain name change requests to the registrar in response to various events. This automated functionality can either entirely replace the role performed by a human user, or may assist the human user in performing his or her administrative role.

The requesting entities 404 and 406 can represent any kind of data processing equipment, such as respective computers coupled to the WAN 402 via broadband connectivity, dial-up modem connectivity, DSL connectivity, or some other connectivity. The requesting entities (404, 406) can alternatively be implemented using other kinds of devices, such as servers, application-specific consoles of various types, and so on.

A change implementation entity 408 generally represents any infrastructure that is assigned the role of handling domain name registration tasks, such as requests to add new domains or update existing domains. This entity 408 can encompass one or more registrars. A registrar refers to an entity, such as a private company, that has been empowered (by appropriate governmental bodies and/or overseeing organizations) to process domain name registration tasks. Network Solution, Inc. refers to one such organization. All registrars make changes to the Internet domain space with reference to a central database of domain names. As defined here, the change implementation entity 408 can also encompass other elements of the domain name system (DNS) that are involved in registering a new domain or updating a new domain. For instance, once the registrar processes a domain change request, it must propagate the necessary information out to appropriate name servers in the WAN 402, such as various top level domain (TLD) name servers. DNS modification functionality 410 broadly refers to any elements of the WAN 402 that are involved in the domain name registration operation. A domain name does not become active until the changes from the registrar are propagated to the necessary name servers represented by functionality 410. (Note that the functionality 410 is shown as separate from the WAN 402 to facilitate discussion; however, portions of the functionality 410 should be properly interpreted as also forming part of the WAN 402.)

FIG. 4 also shows that the change implementation entity 408 includes a work order queue 412. This queue 412 can correspond to one or more record logs maintained by the registrars (or other entities involved in implementing domain change requests). The queue 412 stores domain change requests received from the requesting entities (e.g., requesting entities 404 and 406). The change implementation entity 408 can be configured to process the domain change requests in the queue 412 in the order received, or based on some other consideration. For instance, the change implementation entity 408 can be configured to grant priority to one or more requests under various circumstances.

The system 400 also provides a monitoring and notifying entity 414 (referred to for brevity as the "monitoring entity" 414). As the name suggests, this entity 414 is assigned the role of monitoring the progress of the change implementation entity 408 in implementing the user's domain change request. That is, this entity 414 determines when the change implementation entity 408 has completed its registration task, resulting in the activation of the changed domain name. When the domain becomes active, the monitoring entity 414 is configured to notify the requesting entity (or some other entity or entities) of this event.

More specifically, by way of overview, the monitoring entity 414 receives the domain change request from a requesting entity, say, for example, requesting entity 404. The monitoring entity 414 can then also forward this request to the change implementation entity 408; alternatively, in the case illustrated in FIG. 4, the requesting entity 414 can itself simultaneously transmit the domain change request to both the monitoring entity 414 and the change implementation entity 408, thus eliminating the need for the monitoring entity 414 to perform this transfer. In any case, when the monitoring entity 414 receives the domain change request, it extracts information from this request and stores it in a domain table (to be described below). The transfer of this information to the domain table is illustrated in FIG. 4 by the arrow labeled "Log (2)" in FIG. 4 (meaning that this operation is a "logging" operation and, chronologically, it is performed second in the series of operations shown in FIG. 4).

Figure 5:
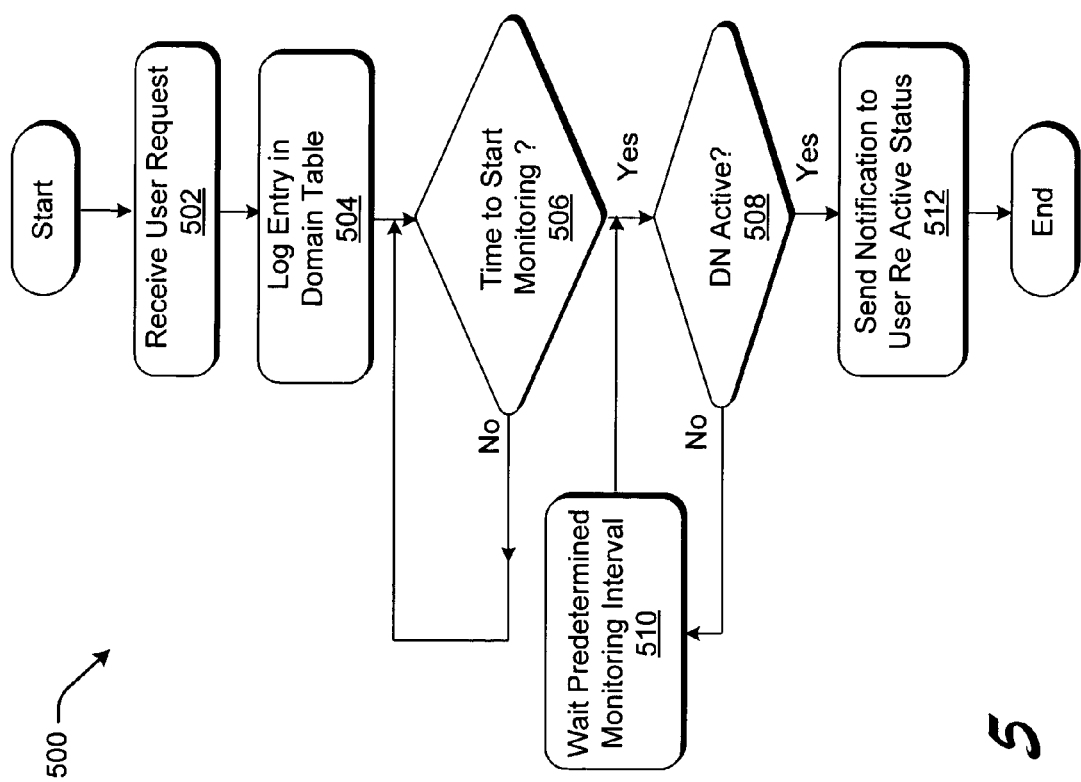
FIG. 5 shows an exemplary procedure for notifying a user of domain changes.

Some time after the monitoring entity 414 has recorded the domain change request, it commences monitoring the change implementation entity 408 to determine whether the registrar and associated DNS functionality 410 have activated the domain name. The monitoring entity 414 can perform this role by waiting a predetermined time, and then periodically checking the active status of the domain. This periodic checking operation is illustrated in FIG. 4 by the arrow labeled "Periodic Query" and the arrow labeled "Response." The subscripts (e.g., $3_1$, $3_2$, $3_3$, etc., and $4_1$, $4_2$, $4_3$, etc.) indicate that these queries and responses are performed several times at periodic intervals until a response indicates that the domain has become active. Once the monitoring entity 414 receives a response indicating that the domain has become active, it sends a notification to the requesting entity 404 (or any other appropriate entity or entities). This notification can be performed via e-mail, land line telephone transmission, cellular phone transmission, telegram, regular mail, or some other communication mechanism. FIG. 5 illustrates the notification operation by the arrow labeled "Notification (5)." Each of the above-mentioned operations (1)-(5) will be described in further detail in the context of Section B below.

The monitoring entity 414 can be configured using any kind and combination of data processing equipment. For instance, the monitoring entity 414 can be implemented as one or more servers or other kinds of computer equipment coupled to the WAN 402. Generally, the functionality that implements the monitoring equipment 414 can be physically located at a single site, or can be distributed over multiple sites. The functionality can be implemented as software, hardware, or a combination of software or hardware. The equipment that implements the monitoring entity 414 can be specifically dedicated to performing the monitoring and notification tasks to be described below, or can also implement a variety of other unrelated tasks (not illustrated).

In one implementation, the monitoring entity 414 can be administered by a third part entity that is not necessarily affiliated with either the requesting entity 404, or the change implementation entity 408 (e.g., the registrar). For instance, in this implementation, the monitoring entity 414 can be implemented as a web service that can be accessed by a plurality of different users for a fee (or for free of charge). In another case, the monitoring entity 414 can be affiliated with the requesting entity 404. For instance, in this implementation, a single company may provide the monitoring entity 414 as part of its general networking resources; thus, the monitoring entity 414 may be just part of a more comprehensive system devoted to serving the company's business activities. In this implementation, users in the company (or just within the company's IT department) can operate computers that serve as requesting entities to interact with the monitoring entity 414. In still another case, the monitoring entity 414 can be implemented as part of the change implementation entity 408, such as part of the services provided by a registrar. In this implementation, the computer infrastructure that implements other aspects of the registration process can also handle the monitoring and notification tasks to be described below. Still additional allocations of functions are possible. In summary, FIG. 4 illustrates the separation of different functions performed by the system 400 into three separate entities (e.g., the requesting entity 404, the change implementation entity 408, and the monitoring entity 414) to facilitate discussion; but there is no requirement that these entities be implemented by physically separate equipment, or that these entities be administered by separate commercial or organizational entities.

B. The Monitoring and Notifying Entity

FIG. 4 shows different functions performed by the monitoring and notifying entity 414. These functions are illustrated as distinct modules to facilitate discussion. These modules can correspond to software, firmware, or a combination of software and firmware for performing the prescribed functions. The separation of these functions can correspond to an actual physical grouping and allocation of such software and/or hardware, or can correspond to a conceptual allocation of different tasks performed by a single software and/or hardware implementation. These modules can be located at a single site (e.g., as implemented by a single server), or can be distributed over plural locations.

Generally, the monitoring entity 414 includes interface functionality 416 for receiving a domain change request from the requesting entity 404, for optionally forwarding this domain change request to the change implementation entity 408, and for eventually forwarding the domain activation notification to the requesting entity 404 (or to any other appropriate recipient entities). This interface functionality 416 can include any kind of software and/or hardware for receiving the request over the WAN 402, or over some other communication route, and then forwarding the notification over the WAN 402, or over some other communication route to a recipient entity.

The monitoring entity 414 also includes a store 418. The store 418 can represent a database and/or memory for storing various tables (to be described below), or other information. The store 418 can represent a single repository of information or multiple distributed repositories of information.

The monitoring entity 414 also includes processing functionality 420 for performing various operations. For instance, the processing functionality 420 can implement different functions (implemented by software code) e.g., when executed by a processing device or devices.

To begin with, the processing functionality 420 can include monitoring setup functionality 422 that extracts information from the domain change request received from the requesting entity 404, and then stores such information in a domain table 424 (or tables). The following table shows exemplary domain table contents:

TABLE 1

Exemplary Domain Table

| Domain Name | Start Time | Notification Email(s) | Updated Name Servers | Processed |
|---|---|---|---|---|
| Mydomain1.com | 11/19/03 at 11:10:32 AM | User1@hotmail.com | 54.46.233.1 56.54.56.33 | 1 |
| Mydomain2.com | 11/20/04 at 01:00:03 PM | User2@domain2.com | 5.34.23.1 | 0 |
| My domain3.com | 11/20/04 at 11/20/03 PM | User3@domain3.com Cust1@acme.com Cust2@acme.com | 65.23.4.12 | 0 |
| . . . | . . . | . . . | . . . | . . . |
| . . . | . . . | . . . | . . . | . . . |

The first column of the exemplary domain table 424 identifies the domain name specified in the domain change request. This domain name refers to either a new domain name that is specified in the request that did not exist prior to the request or to an existing new domain name that is to be updated (e.g., by making a domain name transfer or a domain name re-delegation).

The second column provides a time stamp ("start time") that indicates the time that the monitoring entity 414 received the domain change request or performed some other initial function in association with its monitoring role (such as logging the entry in the domain table 424).

The third column identifies the email addresses of those entities who should receive notifications when the domain goes active. One such entity might correspond to the user who initiated the change request via the requesting entity 404. Another such entity might correspond to anyone who will use the domain for any purpose after it becomes active, such as one or more customers who regularly use a company's web site. In still another case, the entity can correspond to a module or a system that receives the notification and performs some function or functions based thereon. In general, the term "recipient" entity refers to any of the above-mentioned entities, as well as other possible entities.

The fourth column identifies (if available) the IP address (es) of the name server or servers associated with the new domain or the updated domain. More specifically, these address(es) refer to the IP address(es) of the name server(s) that will serve the domain after re-delegation or transfer of the domain. These IP address(es) are generally known when the user initiates the request to re-delegate or transfer the domain. For example, when a user wants to re-delegate his or her domain so that the user can use a certain company's services, that company can tell the user to re-delegate his or her domain to use that company's name server(s). The IP address(es) for this re-delegation correspond to the IP address(es) of the company's name server(s), which are known.

The fifth column identifies whether the domain has been determined to be active. In the exemplary implementation shown in Table 1, a "1" indicates that domain has been assessed as active, while a "0" indicates that it has not yet been assessed as active. Monitoring is performed for any change request having a "0" entry in the domain table 424.

The above-specified contents of Table 1 are exemplary. In other implementations, additional information can be stored in the domain table 424 and subsequently used in the monitoring operation. In still other implementations, certain fields in Table 1 can be omitted.

In addition to the monitoring table, the store 418 can also record one or more configuration tables 426. A configuration table 426 stores various information regarding the behavior or characteristics of the registration and DNS environment. The processing functionality 420 can consult this information when performing its monitoring role. For instance, the configuration table 426 can store various information regarding the amounts of time required to make domain name changes associated with different respective top level domains. More specifically, the configuration table 426 can store the minimum amounts of time typically required to complete domain name changes corresponding to different respective top level domains (such that no domain change request can be expected to take less time than the minimum update entry identified in configuration table 426). The configuration table 426 can also store information regarding recommended checking intervals for respective top level domains that govern the frequency at which the monitoring entity 414 queries the change implementation entity 408. Table 2 below illustrates an excerpt of one such configuration table 426.

TABLE 2

Exemplary Configuration Table

| Top Level Domain | Minimum Update Time | Checking Interval Time |
|---|---|---|
| Com | 720 (minutes) | 30 (minutes) |
| Net | 720 | 30 |
| Org | 15 | 2 |
| Us | 15 | 2 |
| Biz | . . . | . . . |
| Info | . . . | . . . |
| Co.uk | . . . | . . . |
| De | . . . | . . . |
| Jp | . . . | . . . |
| Fr | . . . | . . . |
| Es | . . . | . . . |
| . . . | . . . | . . . |
| . . . | . . . | . . . |

The three fields of information identified above in Table 2 are exemplary. The configuration table 426 can also store additional information regarding the behavior of the registration process (for different top level domains), or can omit one or more of the fields specified above. In still another implementation, the monitoring entity 414 can entirely dispense with the use of configuration table 426; in this case, the monitoring entity 414 can use the same monitoring protocol for monitoring all domain change requests, regardless of what top level domains they target.

The processing functionality 420 can include monitoring functionality 428 that performs the actual task of monitoring the change implementation entity 408 to detect when it has activated the domains identified in the domain table 424. The algorithm for performing this task for a particular domain change request involves accessing the domain table 424 and the configuration table 426 to determine whether sufficient time has elapsed to start monitoring for the activation of the domain. That is, this determination can be performed by subtracting the start time listed in the domain table 424 from the present time, and then comparing the difference to the minimum update time identified in the configuration table 426. If the difference is greater than the minimum update time, then the monitoring functionality 428 commences its monitoring operation.

The monitoring operation can be implemented by issuing a DNS command (such as an nslookup command) that receives as input the changed domain name (that is, that receives as input either the domain name that is being newly created or the domain name that is being updated). This command will return the IP address of the name server that implements the specified domain name (if that name server exists at the time of inquiry). The returned IP address is compared with the updated name server IP address specified in the domain table 424. If these IP addresses agree, then the domain has been activated. In this case, the monitoring functionality 428 updates the last column of the domain table 424 from 0 to 1, to indicate that this domain has now been processed. This operation is followed by sending a notification to one or more recipient entities identified in the third column of the domain table 424.

However, in the event that the DNS query sent to the change implementation entity 408 does not return an IP address that matches the updated name server IP address in the domain table 424, then the domain is not yet active. In this case, the monitoring functionality 428 will make another DNS query after the time interval specified in the configuration table 426 has transpired. As described in Section A, additional queries and responses can be performed until the IP address returned by the change implementation entity 408 matches the address specified in the fourth column of the domain table 424.

Finally, the processing functionality 414 includes notification functionality 430 for performing the task of preparing an email or some other kind of message that alerts one or more recipient entities when a domain becomes active. Again, the notification functionality determines what entities should receive notification by consulting the third column of the domain table 424.

The processing functionality 420 can implement the above described series of operations for all of the entries in the domain table 424 that are designated as not yet processed (as reflected by a 0 entry in the last column of the domain table 424). For example, in one implementation, the monitoring entity 414 can periodically examine the domain table 424 to cull a batch of those entries that currently have a 0 entry in their last column. It can then form a smaller batch corresponding to those requests for which the initial waiting period (e.g., the minimum update time) has transpired. The monitoring entity 414 can then commence monitoring the change implementation entity 408 for those remaining requests in the batch. This monitoring can comprise periodically checking the active status of the domains in the manner described above. The monitoring entity 414 records a "1" value in the last column of the domain table 424 for those domains that are determined to have become active.

C. Exemplary Method for Performing Monitoring and Notification

FIG. 5 shows a procedure 500 that summarizes the above-described operations performed by the monitoring entity 414 for one particular domain change request in the domain table 424. In step 502 the monitoring entity 414 receives the domain change request. In step 504, the monitoring entity 414 creates an entry in the domain table 424 for the domain change request. In step 506, the monitoring entity 414 determines whether it is time to start monitoring the change implementation entity 408 to determine whether the domain is active. This can be determined by consulting the minimum update time specified in the configuration table 426. If step 506 is answered in the affirmative, then, in step 508, the monitoring entity 414 determines whether the domain is active or not. As mentioned above, this can be determined by comparing the IP address returned in response to a DNS query with an entry logged in the "updated name server" column of the domain table 424. If step 508 is answered in the negative, then, in step 510, the monitoring entity 414 waits a predetermined time specified in the configuration table 426 before it repeats step 508. However, if step 508 is answered in the affirmative, then, in step 512, the monitoring entity 414 sends a notification to any recipient entities identified in the third column of the domain table 424.

FIG. 5 pertains to checking performed for only one entry in the domain table 424. But, as mentioned above, the monitoring entity 414 can perform the operations shown in FIG. 5 for a batch of entries in the domain table 424. That is, as mentioned above, the monitoring entity 414 can cull a plurality of active status entries (demarcated by a 0 in the last column of the domain table 424) and then perform the steps shown in FIG. 5 on these entries in parallel or in series.

D. Exemplary Computer Environment

In one exemplary implementation, the monitoring entity 414 shown in FIG. 4 can be implemented as a computer running software. In this case, FIG. 6 provides information regarding an exemplary computer environment 600 that can be used to implement the monitoring entity 414.

The computing environment 600 includes a general purpose or sever type computer 602 and a display device 604. However, the computing environment 600 can include other kinds of computing equipment. For example, although not shown, the computer environment 600 can include handheld or laptop devices, set top boxes, mainframe computers, etc. Further, FIG. 6 shows elements of the computer environment 600 grouped together to facilitate discussion. However, the computing environment 600 can employ a distributed processing configuration. In a distributed computing environment, computing resources can be physically dispersed throughout the environment.

Exemplary computer 602 includes one or more processors or processing units 606, a system memory 608, and a bus 610. The bus 610 connects various system components together. For instance, the bus 610 connects the processor 606 to the system memory 608. The bus 610 can be implemented using any kind of bus structure or combination of bus structures, including a memory bus or memory controller, a peripheral bus, an accelerated graphics port, and a processor or local bus using any of a variety of bus architectures. For example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 602 can also include a variety of computer readable media, including a variety of types of volatile and non-volatile media, each of which can be removable or non-removable. For example, system memory 608 includes computer readable media in the form of volatile memory, such as random access memory (RAM) 612, and non-volatile memory, such as read only memory (ROM) 614. ROM 614 includes an input/output system (BIOS) 616 that contains the basic routines that help to transfer information between elements within computer 602, such as during start-up. RAM 612 typically contains data and/or program modules in a form that can be quickly accessed by processing unit 606.

Other kinds of computer storage media include a hard disk drive 618 for reading from and writing to a non-removable, non-volatile magnetic media, a magnetic disk drive 620 for reading from and writing to a removable, non-volatile magnetic disk 622 (e.g., a "floppy disk"), and an optical disk drive 624 for reading from and/or writing to a removable, non-volatile optical disk 626 such as a CD-ROM, DVD-ROM, or other optical media. The hard disk drive 618, magnetic disk drive 620, and optical disk drive 624 are each connected to the system bus 610 by one or more data media interfaces 628. Alternatively, the hard disk drive 618, magnetic disk drive 620, and optical disk drive 624 can be connected to the system bus 610 by a SCSI interface (not shown), or other coupling mechanism. Although not shown, the computer 602 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 602. For instance, the readable media can store the operating system 630, monitoring-specific functionality (for implementing the functionality of monitoring entity 414), other program modules 634, and program data 636.

The computer environment 600 can include a variety of input devices. For instance, the computer environment 600 includes the keyboard 638 and a pointing device 640 (e.g., a "mouse") for entering commands and information into computer 602. The computer environment 600 can include other input devices (not illustrated), such as a microphone, joystick, game pad, satellite dish, serial port, scanner, card reading devices, digital or video camera, etc. Input/output interfaces 642 couple the input devices to the processing unit 606. More generally, input devices can be coupled to the computer 602 through any kind of interface and bus structures, such as a parallel port, serial port, game port, universal serial bus (USB) port, etc.

The computer environment 600 also includes the display device 604. A video adapter 644 couples the display device 604 to the bus 610. In addition to the display device 604, the computer environment 600 can include other output peripheral devices, such as speakers (not shown), a printer (not shown), etc.

Computer 602 operates in a networked environment using logical connections to one or more remote computers, such as a remote computing device 646. The remote computing device 646 can comprise any kind of computer equipment, including a general purpose personal computer, portable computer, a server, etc. Remote computing device 646 can include all of the features discussed above with respect to computer 602, or some subset thereof. In the context of the system 400 of FIG. 4, the remote computer 646 can represent a computer used by a requesting entity (e.g., 404 or 406), a computer used by a registrar associated with the change implementation entity 408, and so on.

Any type of network 648 can be used to couple the computer 602 with remote computing device 646, such as the WAN 402 of FIG. 4, a LAN, etc. The computer 602 couples to the network 648 via network interface 650 (e.g., the interface 416 shown in FIG. 4), which can utilize broadband connectivity, modem connectivity, DSL connectivity, or other connection strategy. Although not illustrated, the computing environment 600 can provide wireless communication functionality for connecting computer 602 with remote computing device 646 (e.g., via modulated radio signals, modulated infrared signals, etc.).

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method of notifying a user of the activation of a domain, comprising:

receiving a domain change request from a requesting entity;

logging information obtained from the domain change request;

monitoring a change implementation entity to determine when a domain specified in the domain change request has become active with the change, by a monitoring entity, wherein the monitoring sends a domain name system (DNS) request to the chance implementation entity and receives a reply back from the change implementation entity that reflects whether the domain is active or not, wherein the reply provides an address of a domain name server in the domain name system, wherein a determination of whether the domain is active or not is made by comparing the address specified in the reply with a stored undated name server address, and wherein the domain is determined to be active when the address specified in the reply matches the stored undated name server address; and sending a notification that the domain is active to a recipient entity when the domain has been determined to become active, wherein the sending of the notification comprises sending an electronic mail message to the recipient entity from the monitoring entity.

2. The method of claim 1, wherein the domain change request instructs the change implementation entity to create a new domain name.

3. The method of claim 1, wherein the domain change request instructs the change implementation entity to update an existing domain name.

4. The method of claim 1, wherein the logging of information obtained from the domain change request includes recording a domain name identified in the domain change request.

5. The method of claim 1, wherein the logging of information obtained from the domain change request includes recording a time stamp that is related to a time at which the domain change request was made.

6. The method of claim 1, wherein the logging of information obtained from the domain change request includes recording a notification address used to send the notification to the recipient entity.

7. The method of claim 1, wherein the logging of information obtained from the domain change request includes recording an updated name server address associated with the domain specified in the domain change request.

8. The method of claim 1, wherein the monitoring of the change implementation entity includes determining whether a predetermined time has elapsed since the domain change request was received, and if so, querying the change implementation entity.

9. The method of claim 8, wherein the monitoring includes determining the predetermined time by looking up the predetermined time in a configuration table.

10. The method of claim 1, further including repeating the sending of a request and receiving of a reply until a reply is received that indicates that the domain is active.

11. A computer readable storage medium including machine readable instructions for implementing the receiving, logging, monitoring, and sending recited in claim 1.

12. An apparatus for notifying a user of the activation of a domain, comprising:

one or more processors;

memory;

interface logic configured to receive a domain change request from a requesting entity;

monitoring setup logic configured to log information obtained from the domain change request;

monitoring logic configured to monitor a change implementation entity to determine when a domain specified in the domain change request has become active with the domain change request, wherein the monitoring logic sends a domain name system (DNS) request to the change implementation entity and receives a reply back from the change implementation entity that reflects whether the domain is active or not, wherein the reply provides an address of a domain name server in the domain name system, wherein a determination of whether the domain is active or not is made by comparing the address specified in the reply with a stored undated name server address, and wherein the domain is determined to be active when the address specified in the reply matches the stored undated name server address; and notification logic configured to send a notification that the domain is active with the domain change request to a recipient entity when the domain has been determined to become active with the domain change request, wherein the notification logic is configured to send the notification by sending an electronic mail message to the recipient entity.

13. The apparatus of claim 12, wherein the domain change request instructs the change implementation entity to create a new domain name.

14. The apparatus of claim 12, wherein the domain change request instructs the change implementation entity to update an existing domain name.

15. The apparatus of claim 12, wherein the apparatus further includes a store, and wherein the monitoring setup logic is configured to record a domain name, in the store, that is identified in the domain change request.

16. The apparatus of claim 12, wherein the apparatus further includes a store, and wherein the monitoring setup logic is configured to record a time stamp, in the store, that is related to a time at which the domain change request was made.

17. The apparatus of claim 12, wherein the apparatus further includes a store, and wherein the monitoring setup logic is configured to record a notification address, in the store, used to send the notification to the recipient entity.

18. The apparatus of claim 12, wherein the apparatus farther includes a store, and wherein the monitoring setup logic is configured to record an updated name server address, in the store, associated with the domain specified in the domain change request.

19. The apparatus of claim 12, wherein the monitoring logic is configured to determine whether a predetermined time has elapsed since the domain change request was received, and if so, query the change implementation entity.

20. The apparatus of claim 19, wherein the apparatus farther includes a store, and wherein the monitoring logic is configured to determine the predetermined time by looking up the predetermined time in a configuration table provided in the store.

21. The apparatus of claim 12, wherein the monitoring logic is further configured to repeat the sending of a request and receiving of a reply until a reply is received that indicates that the domain is active.

22. A computer readable storage medium including machine readable instructions for implementing the interface logic, monitoring setup logic, monitoring logic, and notification logic as recited in claim 12.

23. An apparatus for notifying a user of the activation of a domain, comprising:

means for receiving a domain change request from a requesting entity;

means for logging information obtained from the domain change request;

means for monitoring a change implementation entity to determine when a domain specified in the domain change request has become active with the change, wherein the means for monitoring sends a domain name system (DNS) request to the change implementation entity and receives a reply back from the change implementation entity that reflects whether the domain is active or not, wherein the reply provides an address of a domain name server in the domain name system, wherein a determination of whether the domain is active or not is made by comparing the address specified in the reply with a stored undated name server address, and wherein the domain is determined to be active when the address specified in the reply matches the stored undated name server address; and means for sending a notification to a recipient entity when the domain has been determined to become active with the change, wherein the sending of the notification comprises sending an electronic mail message to the recipient entity.

24. A computer readable storage medium including machine readable instructions stored upon for implementing the means for receiving, means for logging, means for monitoring, and means for sending recited in claim 23.

* * * * *